Patented Feb. 15, 1938

2,108,133

UNITED STATES PATENT OFFICE

2,108,133

PROCESS FOR PRODUCING HIGH MOLECULAR ALCOHOLS FROM THE CORRESPONDING KETONES

Francis John McCall, Wilmington, Del., assignor to E. I. du Pont de Nemours & Company, Wilmington, Del., a corporation of Delaware No Drawing. Application November 25, 1936, Serial No. 112,709

14 Claims. (Cl. 260—156)

This invention relates to the process of catalytically hydrogenating ketones to produce the corresponding secondary alcohols and, specifically, to the process of producing straight-chain, secondary, aliphatic alcohols by catalytically hydrogenating the corresponding ketones of the type

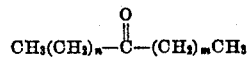

where "$n$" and "$m$" may be any integers from zero to fourteen, inclusive, the values of "$n$" and "$m$" being subject to the further limitation that "$n$" plus "$m$" must be equal to ten, eleven, twelve, thirteen, or fourteen. The phrase "straight-chain aliphatic ketone having approximately fifteen carbon atoms" is for the present purpose defined as, and will hereinafter be used to refer to any ketone belonging to the above class, or any mixture which contains only ketones belonging to the above class. Furthermore, an alcohol will be said to "correspond" to a given ketone when the former differs from the latter only in having a carbinol group in place of the carbonyl group of the ketone.

The prior art discloses numerous methods for the synthesis of secondary alcohols. The Grignard method may be used quite generally, but because it is such an expensive and laborious procedure it is not practical for the commercial preparation of alcohols.

The most practical and direct method for the production of secondary alcohols involves the chemical reduction or the hydrogenation of a ketone. Thus, pentadecanol-8 has been prepared from the ketone by a sodium-alcohol reduction (Kipping, Jour. Chem. Soc., 63, 455 (1893)). The reaction involved may be represented by the following general equation:

$$RCOR + 2Na + 2R'OH \rightarrow RCHOHR + NaOR'$$

It has long been known that acetone, methylethyl ketone, and other ketones of low molecular weight can be catalytically hydrogenated to the corresponding secondary alcohols in either the liquid or vapor phase and in the presence of any of a wide variety of noble or base metal hydrogenation catalysts. For example, acetone has been completely converted into propanol-2 by hydrogenation in the presence of an active nickel catalyst at 23° C., and under a hydrogen pressure of 2 to 3 atmospheres (Covert and Adkins, Jour. Am. Chem. Soc. 54, 4117 (1932)). Similarly heptanone-4 has been converted into heptanol-4 under mild conditions in the presence of a platinum-black catalyst (Vavon, Ann. Chim. 1 (9), 144 (1914)). The literature shows, however, that more vigorous conditions have had to be used in attempts to hydrogenate the higher ketones, and that, under these more vigorous conditions, side reactions such as hydrocarbon formation and polymerization have prevented the successful use of the catalyst procedure in preparing alcohols from the straight-chain ketones of higher molecular weight. Thus, Haller and Lassieur (Compt. rend. 150, 1017 (1910)) in attempting to convert undecanone-2 to the corresponding secondary alcohol by hydrogenation at 300° C. over a nickel catalyst obtained, in addition to unchanged ketone, a hydrocarbon and a condensation product having twenty-two carbons per molecule—but they obtained no eleven-carbon alcohol. Other workers have observed the formation of hydrocarbons and condensation products during the catalytic hydrogenation of higher ketones, and, as will be pointed out later, one of the objects of the present invention is the avoidance of these side reactions.

This invention has as an object the conversion of straight-chain aliphatic ketones or mixtures thereof having approximately 13 to 17 carbon atoms into the corresponding straight-chain secondary alcohols or mixtures thereof. A further object is to accomplish the conversion by means of catalytic hydrogenation. A still further object is to accomplish the conversion in such a manner as to avoid side reactions which result in the formation of hydrocarbons and condensation products, so that, if desired, the alcohols can readily be obtained in nearly theoretical yield, in a high state of purity, and with a minimum of effort and expense. Other objects will appear hereinafter.

These objects are accomplished by bringing a mixture of hydrogen and ketone or mixture of ketones in intimate contact with a catalyst in such a temperature range that the carbonyl group is selectively converted into the carbinol group.

Ketones suitable for use in carrying out this invention may be prepared according to a wide variety of procedures. For example, pentadecanone-8 can be prepared by ketonization of caprylic acid from coconut oil. Similarly, ketonization of the mixture of enanthic, caprylic, and pelargonic acids obtained from the oxidation of oleic acid gives a mixture of tridecanone-7, tetradecanone-7, pentadecanone-7, pentadecanone-8, hexadecanone-8, and heptadecanone-9. Likewise, ketonization of coconut oil acids with acetic acid gives a mixture from which tridecanone-2, pentadecanone-2, heptadecanone-2, tridecanone-6, pentadecanone-6, heptadecanone-6, pentadecanone-8, and heptadecanone-8 may be separated, etc.

The following examples are instances of the application of this invention. They are not to be considered as limitations of the invention since many modifications may be made without departing from the spirit and scope thereof.

*Example I*

A solution of 141 grams of pentadecanone-8 in 47 grams of 95% ethanol was charged into a pressure tube equipped with a shaking device and 15 grams of unsupported nickel catalyst was added. Hydrogen was then admitted to the vessel and maintained at a pressure of 2000 to 2400 pounds per square inch during the hydrogenation which, at 150° C., required fifteen minutes. The product from this and a similar run were combined and filtered while still warm. The filtrate, upon distillation, gave a 97% yield of pentadecanol-8, B. P. 172° to 177° C. at 23 mm. pressure, of which 93% boiled at 175° to 177° C. at 23 mm. pressure. The product was a white, waxy solid: M. P. 48.5° C.; hydroxyl number, found, 241.0, 238.7 (calculated value, 246.0).

*Example II*

A 100-gram sample of pentadecanone-8 was hydrogenated under conditions similar to those of Example I, except that absolute alcohol was used as solvent and the hydrogenation proceeded at a temperature of 100° to 120° C. A 91 per cent yield of pentadecanol-8, B. P. 172° to 177° C. at 23 mm. pressure, was isolated.

*Example III*

About one-third of a commercial sample of coconut oil acids was distilled to give a distillate consisting mainly of caproic, caprylic, and capric acids. Ketonization of the distillate gave a mixture which consisted of thirteen, fifteen, and seventeen carbon straight-chain ketones. Hydrogenation of this crude ketone mixture, according to the procedure described in Example I, gave a corresponding mixture of secondary alcohols, a white waxy solid having a slight fatty odor: B. P. 135° to 208° C. at 15 mm. pressure, freezing point 39° to 41° C. The run required 4.25 hours at a pressure of about 2000 pounds per square inch and a temperature of 150° C.

*Example IV*

A mixture of ketones similar to that described in Example III was hydrogenated at 125° C., in the absence of a solvent and in the presence of 5 per cent of a nickel-on-kieselguhr catalyst. This run required five hours at a pressure range of 300 to 500 pounds per square inch and gave a product similar to that described under Example III.

*Example V*

A sample of mixed enanthic, caprylic, and pelargonic acids was obtained by the oxidation of oleic acid. Ketonization of these acids gave a mixture which consisted of the thirteen, fourteen, fifteen, sixteen, and seventeen carbon ketones. Hydrogenation of the mixture of ketones, according to the procedure of Example I, gave a mixture of the corresponding secondary alcohols: B. P. 152° to 185° C. at 14 mm. pressure, freezing point 48° to 50° C.

In addition to the above, the following alcohols have been prepared by hydrogenating the proper ketone under conditions similar to those of Example I: tridecanol-7, B. P. 130° to 131° C. at 9 mm. pressure, M. P. 41° C.; heptadecanol-9, B. P. 174° C. at 9 mm. pressure, M. P. 59.5° C.; pentadecanol-4, B. P. 155° to 156° C. at 10 mm., M. P. 31° C.; and pentadecanol-2, B. P. 166° C. to 170° C. at 14 mm. pressure, M. P. (crude) 27° to 28° C.

Although in the above examples certain definite conditions of pressure, temperature, catalyst ratio, etc., have been mentioned, it is to be understood that these conditions are by no means critical except as hereinafter specified.

In general, the process is operable between the temperature limits of about 75° to about 200° C. Temperatures of about 100° to about 150° C. are preferred, however, for the reasons that the reaction is less rapid at the lower operable temperatures, and at the higher operable temperatures side reactions such as hydrocarbon formation begin to be important.

Hydrogen pressures from about atmospheric pressure up to and above 5000 pounds per square inch may be used. It is preferable to use pressures of about 100 to about 3000 pounds per square inch, because at lower pressures there is a tendency toward polymerization and higher pressures necessitate the use of more expensive equipment.

It is preferable to use a solvent such as ethanol, methanol, dioxane, or any other solvent which does not react with the ketone, alcohol, or catalyst. The use of a solvent appears to accelerate the hydrogenation somewhat and, since the higher alcohols are usually solids, a solvent assists in the removal of the catalyst from the product.

However, it has been shown that the reaction proceeds readily in the absence of a solvent; under certain circumstances, therefore, (for example, when the product is to be used directly without purification) the use of a solvent may be quite undesirable.

The ketone to be hydrogenated does not need to be pure. It is only necessary that it contain no large amount of materials which poison the catalyst (for example, acids, organic sulfur, etc.).

Since the product is usually white or colorless and corresponds in purity to that of the ketone hydrogenated it is unnecessary, for most purposes, that the product be purified. When a purification is desired it may be accomplished by distillation, recrystallization, or by other known methods.

In the practice of this invention any hydrogenating catalysts, such as platinum, palladium, copper (or oxide), iron (or oxide), or mixtures of the above may be used, but nickel is preferred because of its high degree of activity, low cost, and ease with which it is prepared in very active form.

It is preferred to allow the reaction to proceed until no more hydrogen is being absorbed in order that the product may be of the highest purity. However, since the last 0–20 per cent of hydrogen absorption usually takes place at a lower rate than that of the initial absorption, it is sometimes economical from the time standpoint to interrupt the hydrogenation before it is complete.

Those skilled in the chemical art will recognize the importance of alcohols as one of the most fundamental intermediates in the preparation of a wide variety of organic chemicals. It is sufficient to mention here the higher secondary alkyl sulfates, which are advantageously prepared by direct sulfation of the alcohols, and which are valuable as textile assistants, wetting, penetrating, emulsifying, and cleansing agents. The higher secondary alcohols, as such, may be used as wax-modifying agents, lubricants, etc.

The present invention furnishes a simple, direct, economical synthesis for certain of the higher secondary alcohols.

By the use of the present invention certain advantages are obtained. These may be enumerated as follows:

1. The invention enables one to proceed from an abundant naturally-occurring raw material (fatty acid) to the higher secondary alcohols by a procedure which consists of only two stages.

2. The process of the present invention is superior to the purely chemical reductions of the prior art in that it employs hydrogen, obviously the most economical of reducing agents and one which gives rise to no by-products. As a result of the latter feature, the product may be used without purification or after only a very simple purification.

3. The process of the present invention makes it possible to convert the higher straight-chain ketones into the corresponding secondary alcohols in practically quantitative (97 per cent) yields. As a result the process entails no appreciable weight loss, and purification of the product becomes unnecessary or, where desired, becomes a relatively simple procedure.

It is apparent that many widely different embodiments of this invention may be made without departing from the spirit and scope thereof and therefore it is not intended to be limited except as indicated in the appended claims.

I claim:

1. The process which comprises bringing a mixture of hydrogen and a saturated straight-chain aliphatic ketone having from 13 to 17 carbon atoms in contact with a highly active nickel catalyst at a temperature between 75° and 200° C.

2. The process in accordance with claim 1 characterized in that the reaction is carried out at a temperature of about 100° to about 150° C.

3. The process in accordance with claim 1 characterized in that the reaction is carried out under a pressure between 100 and 3000 pounds per square inch.

4. The process in accordance with claim 1 characterized in that the reaction is carried out at a temperature of about 100° to about 150° C. and under a pressure of about 100 to about 1000 pounds per square inch.

5. The process which comprises bringing a mixture of hydrogen and a saturated straight-chain aliphatic ketone having from 13 to 17 carbon atoms dissolved in ethanol in contact with a highly active nickel catalyst at a temperature of about 100° to about 150° C. and under a pressure of about 100 to about 3000 pounds per square inch.

6. A process which comprises bringing a mixture of hydrogen and a saturated straight-chain aliphatic ketone having 15 carbon atoms in contact with a highly active nickel catalyst at a temperature between 75° and 200° C.

7. The process in accordance with claim 6 characterized in that the reaction is carried out at a temperature of about 100° to about 150° C.

8. The process in accordance with claim 6 characterized in that the reaction is carried out under a pressure between 100 and 3000 pounds per square inch.

9. The process in accordance with claim 6 characterized in that the reaction is carried out at a temperature of about 100° to about 150° C. and under a pressure of about 100 to about 1000 pounds per square inch.

10. The process which comprises bringing a mixture of hydrogen and a saturated straight-chain aliphatic ketone having 15 carbon atoms dissolved in ethanol in contact with a highly active nickel catalyst at a temperature of about 100° to about 150° C. and under a pressure of about 100 to about 3000 pounds per square inch.

11. The process which comprises bringing a mixture of hydrogen and pentadecanone-8 in contact with a nickel catalyst at a temperature between 75° and 200° C.

12. A process which comprises bringing a mixture of hydrogen and pentadecanone-8 dissolved in ethanol in contact with a nickel catalyst at a temperature of about 150° C. and at a pressure of about 2000 to about 2400 pounds per square inch.

13. A process which comprises bringing a mixture of hydrogen and pentadecanone-4 in contact with a nickel catalyst at a temperature between 75° and 200° C.

14. A process which comprises bringing a mixture of hydrogen and pentadecanone-2 in contact with a nickel catalyst at a temperature between 75° and 200° C.

FRANCIS JOHN McCALL.